(12) United States Patent
Niitsuma et al.

(10) Patent No.: US 8,104,831 B2
(45) Date of Patent: Jan. 31, 2012

(54) COUPLING MECHANISM FOR HEADREST OF VEHICLE SEAT

(75) Inventors: Kenichi Niitsuma, Shioya-gun (JP); Hirooki Negishi, Shioya-gun (JP); Jinichi Tanabe, Shioya-gun (JP); Koji Sano, Wako (JP); Koji Uno, Wako (JP); Tatsuya Terauchi, Wako (JP); Tomoki Matsumoto, Wako (JP)

(73) Assignees: TS Tech. Co., Ltd., Asaka (JP); Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/077,325

(22) Filed: Mar. 31, 2011

(65) Prior Publication Data

US 2011/0175410 A1  Jul. 21, 2011

Related U.S. Application Data

(62) Division of application No. 12/279,766, filed as application No. PCT/JP2005/013468 on Jul. 22, 2005.

(51) Int. Cl.
*B60N 2/42* (2006.01)
*B60N 2/427* (2006.01)

(52) U.S. Cl. .................................. 297/216.12
(58) Field of Classification Search .............. 297/216.12
See application file for complete search history.

(56) References Cited

U.S. PATENT DOCUMENTS

| | | | |
|---|---|---|---|
| 4,632,454 A | 12/1986 | Naert | |
| 5,076,643 A | 12/1991 | Colasanti et al. | |
| 6,139,102 A | 10/2000 | von Möller | |
| 6,250,714 B1 * | 6/2001 | Nakano et al. | 297/216.12 |
| 6,260,921 B1 | 7/2001 | Chu et al. | |
| 6,375,262 B1 | 4/2002 | Watanabe | |
| 6,568,753 B1 | 5/2003 | Watanabe | |
| 6,702,377 B2 | 3/2004 | Nakano | |
| 6,783,177 B1 | 8/2004 | Nakano | |
| 6,789,845 B2 * | 9/2004 | Farquhar et al. | 297/216.12 |
| 6,918,633 B2 | 7/2005 | Forkel et al. | |
| 6,955,397 B1 * | 10/2005 | Humer | 297/216.12 |
| 7,044,544 B2 | 5/2006 | Humer et al. | |
| 7,052,087 B2 | 5/2006 | McMillen | |
| 7,077,472 B2 | 7/2006 | Steffens, Jr. | |
| 7,104,602 B2 | 9/2006 | Humer et al. | |
| 7,270,374 B2 | 9/2007 | Moriggi | |
| 7,393,052 B2 * | 7/2008 | Humer et al. | 297/216.12 |
| 7,644,987 B2 * | 1/2010 | Humer et al. | 297/216.12 |
| 2004/0155496 A1 * | 8/2004 | Farquhar et al. | 297/216.12 |

(Continued)

FOREIGN PATENT DOCUMENTS

DE  100 46 391 C1  4/2002

(Continued)

*Primary Examiner* — Rodney B White
(74) *Attorney, Agent, or Firm* — Drinker Biddle & Reath LLP

(57) ABSTRACT

A vehicle seat is provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward, and the backward protrusion extends laterally.

44 Claims, 6 Drawing Sheets

U.S. PATENT DOCUMENTS

| | | |
|---|---|---|
| 2006/0006709 A1* | 1/2006 | Uno et al. ............ 297/216.12 |
| 2009/0001785 A1 | 1/2009 | Swan et al. |

FOREIGN PATENT DOCUMENTS

| | | |
|---|---|---|
| DE | 102 12 828 C1 | 6/2003 |
| JP | 7-75608 A | 3/1995 |
| JP | 10-119619 A | 5/1998 |
| JP | 10-138811 A | 5/1998 |
| JP | 10-138812 A | 5/1998 |
| JP | 10-138814 A | 5/1998 |
| JP | 11-034708 A | 2/1999 |
| JP | 11-192869 A | 7/1999 |
| JP | 11-206506 A | 8/1999 |
| JP | 2000-201769 A | 7/2000 |
| JP | 2000-210157 A | 8/2000 |
| JP | 2000-211410 A | 8/2000 |
| JP | 2003-341401 A | 12/2003 |

* cited by examiner

COUPLING MECHANISM FOR HEADREST OF VEHICLE SEAT

CROSS-REFERENCE TO RELATED APPLICATIONS

This application is a divisional application of U.S. patent application Ser. No. 12/279,766, filed Jun. 18, 2009, which is a PCT national stage entry of international patent application no. PCT/JP2005/13468, filed Jul. 22, 2005. The contents of these applications are herein incorporated by reference.

BACKGROUND

The present invention relates to a coupling mechanism for a headrest of a vehicle seat, and more particularly to a coupling mechanism for moving the headrest forward when a forward external force acts on a car body as a result of rear end collisions or the like.

Conventionally, there is known from Japanese Patent Application Laid-Open No. 10-119619 a vehicle seat having a headrest provided in a backrest, a movable member provided inside of the backrest, and a coupling mechanism for coupling the headrest and the movable member mechanically, in which, when a vehicle seat occupant moves backward relative to the vehicle seat due to rear collisions or the like, the movable member is pushed by the occupant to move backward, and the backward movement of the movable member moves the headrest forward by way of the coupling mechanism.

The coupling mechanism of the prior art is disposed substantially at the backside of a cushion of the backrest, and thus the cushion performance may be lowered. That is, the coupling mechanism is provided at a position overlapping the vehicle seat occupant in the front-to-back direction, and thus the cushion design is restricted.

The movable member in the prior art is narrow in its movable range, and the distance of moving the headrest forward is short, and means for compensating for lack of distance is difficult.

SUMMARY

It is hence an object of embodiments of the invention to provide a coupling mechanism for a headrest capable of amplifying the small moving amount of the movable member and transmitting the movement to the headrest. It is another object of embodiments of the invention to provide a coupling mechanism for a headrest capable of amplifying the moving amount of the movable member with a simple configuration. It is still another object of the invention to provide a coupling mechanism for a headrest not interfering with the cushion of the backrest substantially.

Therefore, a vehicle seat is provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward, and the backward protrusion extends laterally.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with a backward protrusion protruding backward in at least an end part in a vertical direction, and the backward protrusion extends laterally.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member and is provided with first and second backward protrusions protruding backward, and the first and second backward protrusions extend laterally and are arranged in parallel with each other.

A vehicle seat is also provided comprising a seat back frame having right and left side frames, a headrest for supporting a head of a seat occupant, and a back-and-forth movable body provided inside a backrest that is positioned at a rear of the seat occupant, wherein a backward movement of the back-and-forth movable body forwardly moves the headrest to support the head of the seat occupant. The back-and-forth movable body is attached to each side frame through a link member, provided with a first backward protrusion protruding backward in an upper end part thereof, and provided with a second backward protrusion protruding backward in a lower end part thereof, and the first and second backward protrusions extend laterally.

BRIEF DESCRIPTION OF THE DRAWINGS

An embodiment of the invention is shown in the following figures.

DETAILED DESCRIPTION

Figure 1:
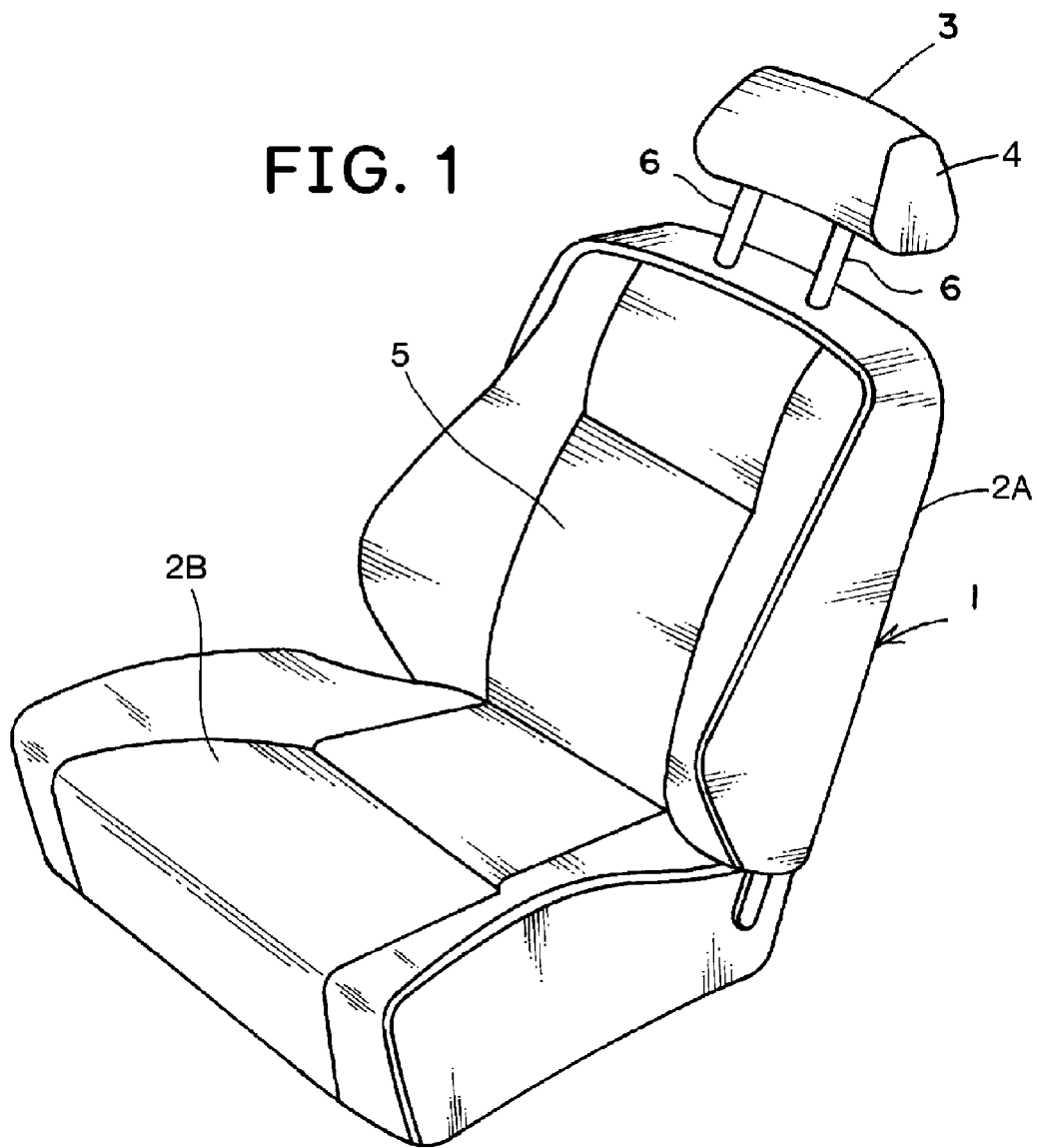
FIG. 1 is an overall perspective view of a vehicle seat.

An embodiment of the invention will be described with reference to the accompanying drawings. A vehicle seat 1 of the invention has a backrest 2A, a seat bottom 2B, and a headrest 3 having a head support 4 is provided in an upper part of the backrest 2A. A backrest frame 16 of the backrest 2A has a square frame shape, including a pair of side frames 40, each having an inward extension 40a and outwardly recessed portion 50, an upper frame 41, and a lower frame 42.

Near the upper frame 41, an upper movable member 10 (headrest support member) movable laterally to the backrest frame 16 is disposed. Vertical pillar supports 11 for inserting the lower parts of pillars 6 of the headrest 3 are fixed in the movable member 10. The pillars 6 are supported by the pillar supports 11 to be adjustable in height. The movable member 10 also has an outward extension 12a, and a forward extension 12b, as well as a protrusion 14 having an anteroposterior extension, and a forward bent portion 14a.

Figure 2:
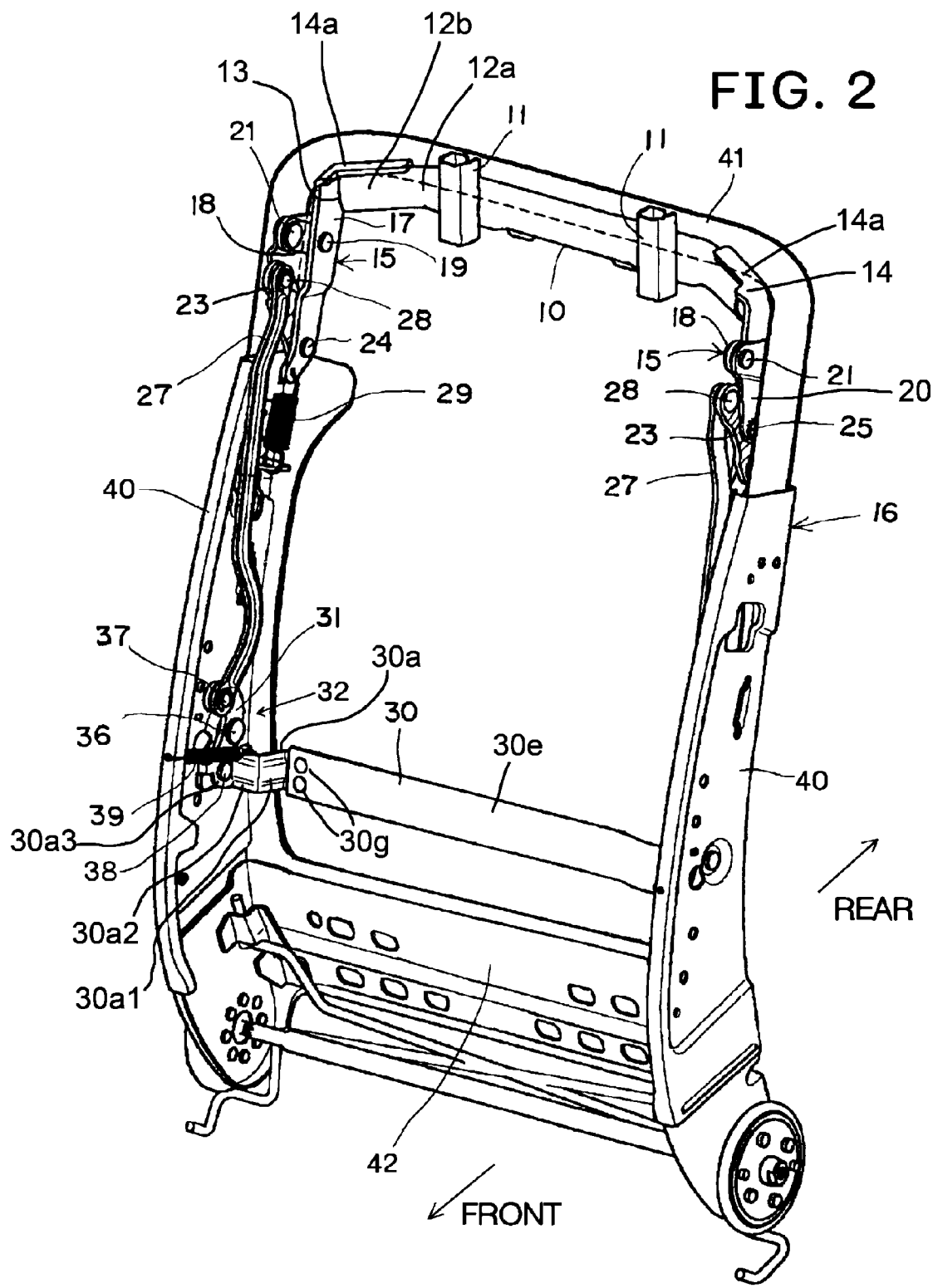
FIG. 2 is a perspective view showing a backrest frame and a part of a coupling mechanism for a headrest.
Figure 3:
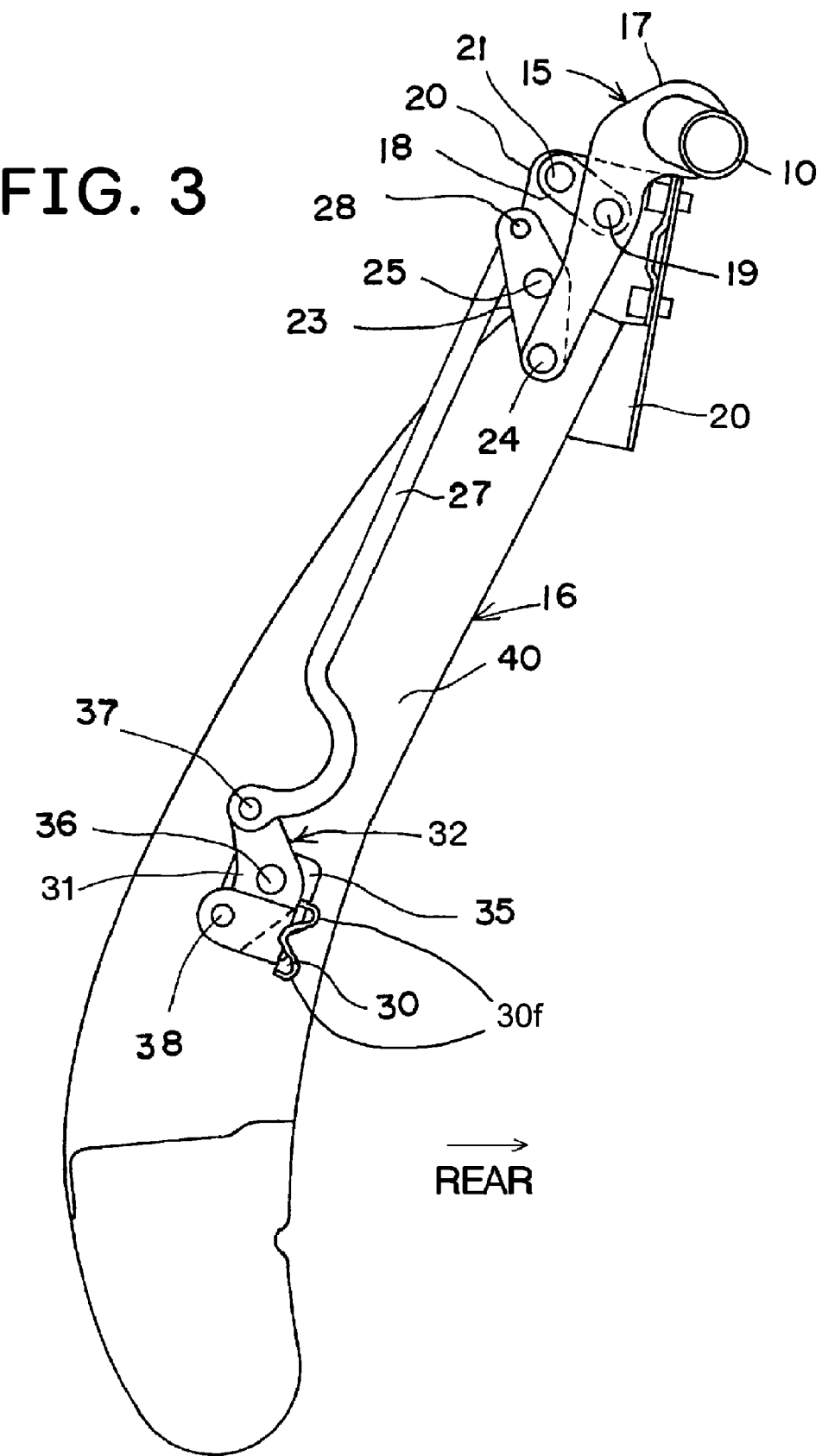
FIG. 3 is a side view of the coupling mechanism for a headrest.
Figure 4:
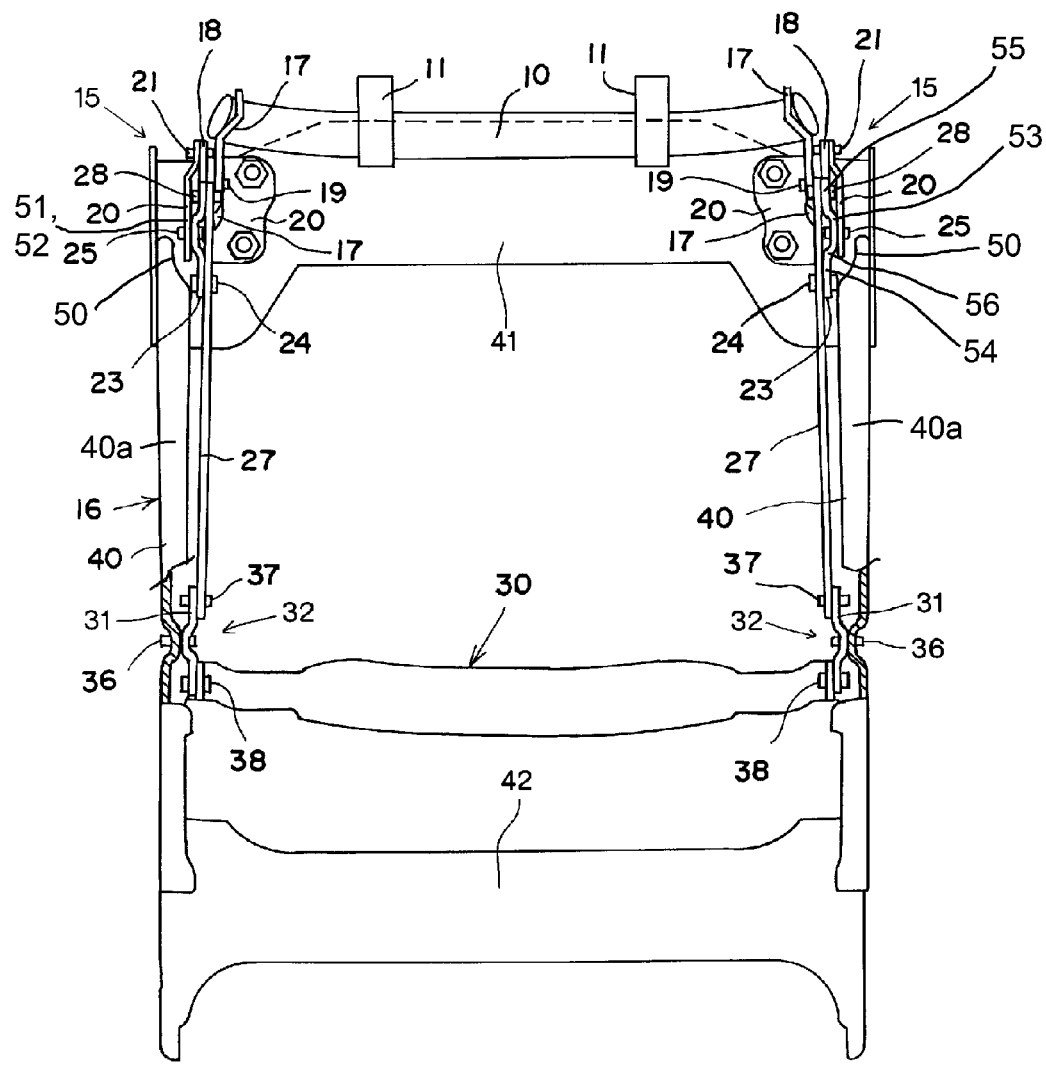
FIG. 4 is a front view of the backrest frame and the coupling mechanism for a headrest.
Figure 7:
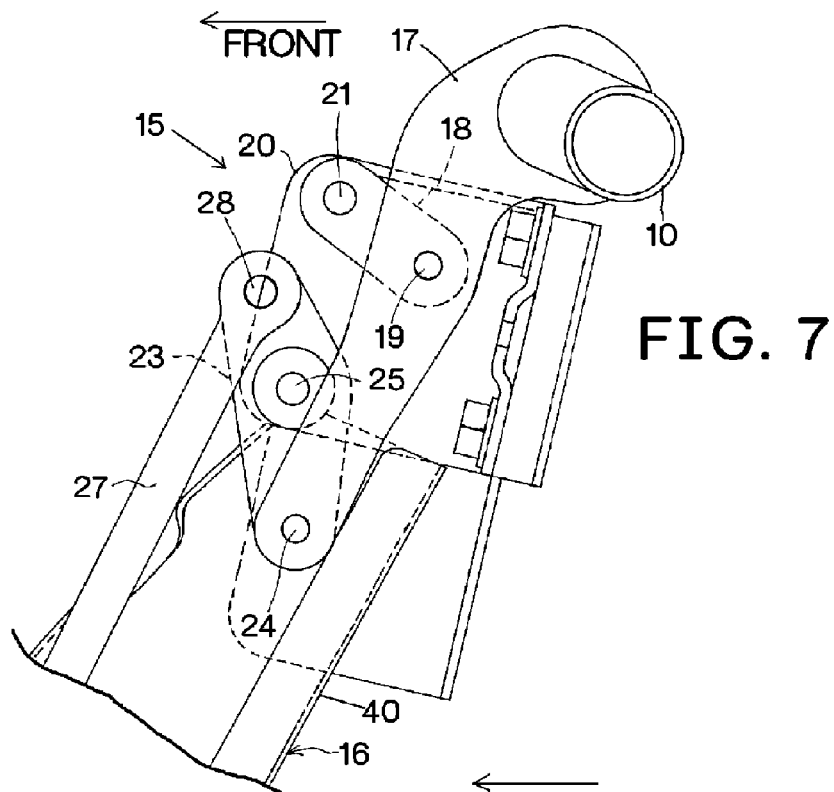
FIG. 7 is a magnified side view of an upper link mechanism of the coupling mechanism.

Both right and left sides of the upper movable member 10 are attached to the backrest frame 16 by way of an individual upper link mechanism 15. Each upper link mechanism 15 has a long first link 17 (downward extension), an arm 18 (second link member), and a second link 23 (first link member) as shown in FIGS. 2, 3 and 7. The end part of the upper movable member 10 is fixed to an upper part of the first link 17, and the arm 18 is rotatably pivoted on an L-shaped bracket 20 (bracket, bracket member) fixed in the upper part of the backrest frame 16 by way of a shaft 21 (second link support shaft). An intersection 13 exists between the first link 17 and the forward extension 12b. The second link 23 is rotatably pivoted on the bracket 20 by way of a shaft 25 (first link support shaft). The leading end of the arm 18 is pivoted on the vertical intermediate position of the first link 17 by way of a shaft 19 (second coupling shaft), and the leading end of the second link 23 is pivoted on the lower part of the first link 17 by way of a shaft 24 (first coupling shaft). The other end of the second link 23 is pivoted on the upper part of a long coupling rod 27 (transmission member) by way of a shaft 28. The bracket 20 has a link support portion 51 with a link support surface 52. The second link 23 has a bracket attachment 53, a first extension 54 and a second extension 55. The second link 23 also has a bent portion 56.

The first link 17, the arm 18 and the second link 23 of the upper link mechanism 15 are preliminarily assembled in, preferably, the bracket 20. As a result, the bracket provided with the link mechanism can be easily assembled in the backrest frame 16 as a unit module. The bracket provided with the link mechanism makes it easy to manage storage parts, and to replace parts in maintenance operations.

Figure 6:
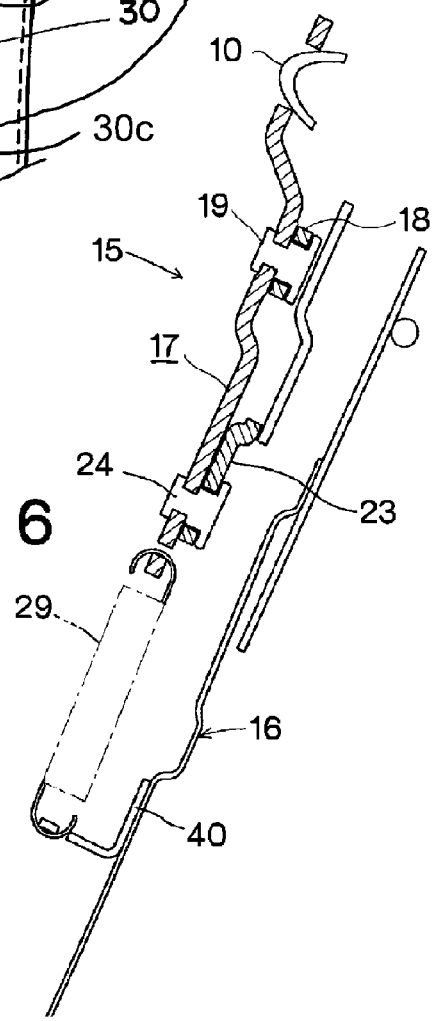
FIG. 6 is a sectional view of a first link of the coupling mechanism.

As shown in FIGS. 2 and 6, one end of an upper spring 29 is coupled to the lower part of the first link 17, and the other end of the upper spring 29 is coupled to the side frame 40. The first link 17 is usually held at a lower waiting position in FIG. 7 by an elastic force of the spring 29, and hence the headrest 3 is held at an ordinary position. When the first link 17 moves up to a position indicated by solid line in FIG. 8, the upper movable member 10 moves forward, and the headrest 3 is forced out forward.

Between the side frames 40, 40, a lower movable member 30, which may be a back-and-forth movable body or a sensing member, stretching laterally is disposed. The lower movable member 30 is pushed by a vehicle seat occupant and moved backward when the vehicle seat relatively moves forward of the occupant due to a rear end collision. Both sides of the lower movable member 30 are coupled to the ends of the lower link 31 (link member) of the lower link mechanism 32 by way of shafts 38 (coupling shafts). The lower movable member 30 comprises a plate-shaped portion 30e that connects to the shaft 38 via a coupling plate member 30a (also called a coupling member or end extension) through a first extension 30a1, second extension 30a2, and third extension 30a3. The lower movable member 30 also comprises a shaft member 30g. The other end of the lower link 31 is coupled to the lower part of the coupling rod 27 (transmission member) by way of a shaft 37. The lower link 31 is preferably a bell crank. The center of the lower link 31 is pivoted on a lower bracket 35 (bracket member) fixed to the side frame 40 by way of a shaft 36 (link support shaft).

As shown in FIG. 2, one end of the lower spring 39 is coupled to the lower movable member 30, and the other end of the lower spring 39 is coupled to the side frame 40. The lower movable member 30 is held at a forward ordinary position by the elastic force of the spring 39, and when a rear end collision occurs, it is pushed by the vehicle seat occupant and moved backward by resisting the elastic force of the spring 39.

Figure 5:
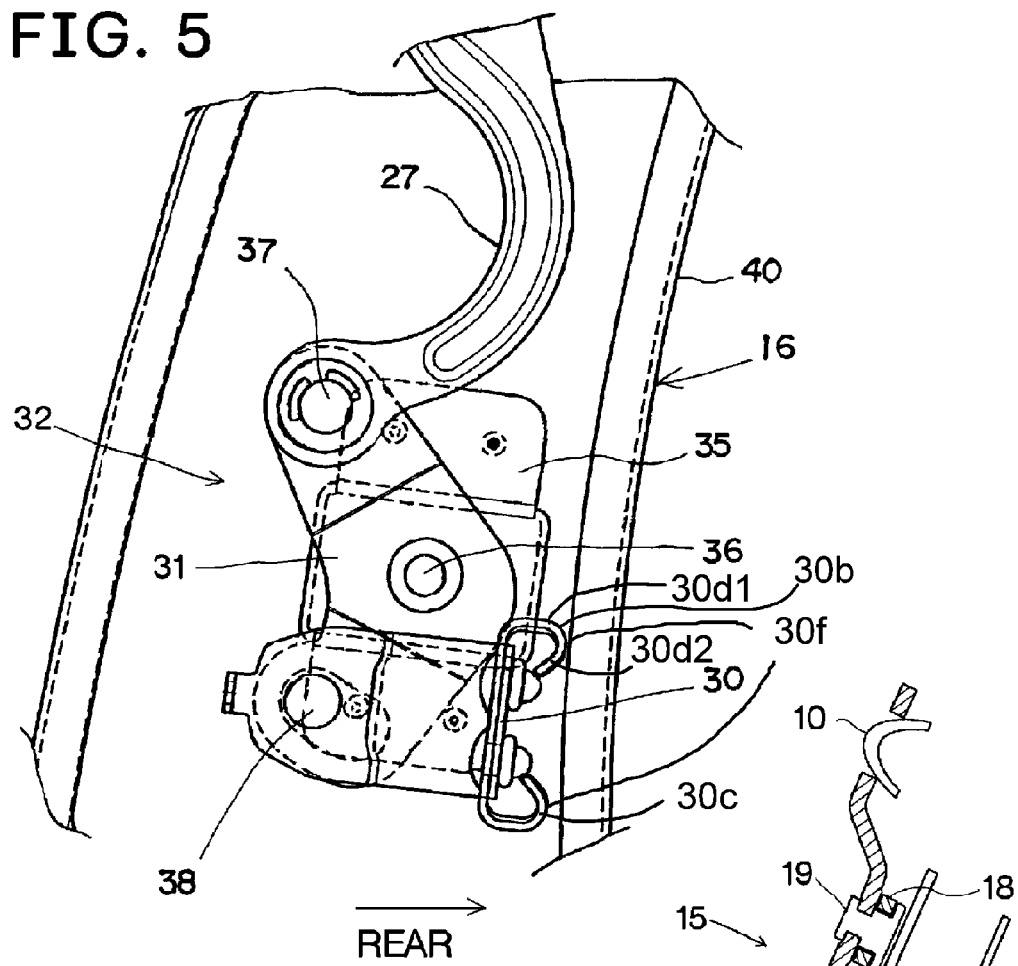
FIG. 5 is a magnified side view of a lower link mechanism of the coupling mechanism.
Figure 8:
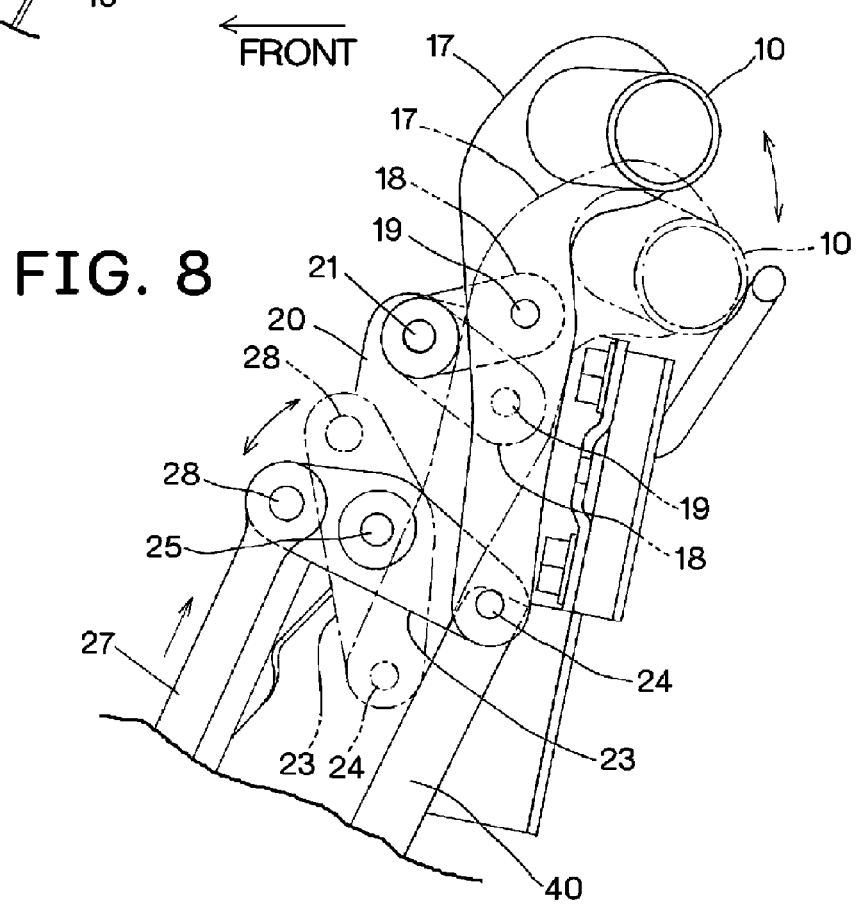
FIG. 8 is a magnified side view showing the first link elevated from the state in FIG. 7.

In FIGS. 3 and 5, the backward movement of the lower movable member 30 causes the lower link 31 to rotate counterclockwise about the shaft 36, and causes the coupling rod 27 to be pulled downward. As a result, the second link 23 rotates counterclockwise about the shaft 25, and moves the first link 17 upward by resisting the elastic force of the upper spring 29. At this time, the distance between the shaft 25 and shaft 28 is shorter than the distance between the shaft 25 and shaft 24. Thus, the second link 23 amplifies the moving amount of the coupling rod 27 (lower movable member 30) to transmit the movement to the first link 17, the upper part of the first link 17 is guided by the arm 18 and moved substantially forward as shown in FIG. 8, and thereby the headrest 3 is moved forward by way of the upper movable member 10 so that a cervical spine of the vehicle seat occupant is protected in the event of a rear end collision.

Thus, the upper link mechanism 15 of this embodiment of the invention has a function of moving the headrest 3 largely forward with a small moving amount of the lower movable member 30. The lower movable member 30 comprises backward protrusions 30f. The backward protrusions 30f may comprise a first backward protrusion 30b (upper backward protrusion) and a second backward protrusion 30c (lower backward protrusion). These each may comprise a first bent portion 30d1 and a second bent portion 30d2.

The side frame 40 of the backrest frame 16 is formed of a metal plate having a specified width in the front-to-back direction, and the upper link mechanism 15, coupling rod 27, and lower link 31 are disposed adjacent to the side frame 40. In addition, the members of the upper link mechanism 15 and the lower link 31 are formed of plates substantially parallel to the side frame 40, and are supported by the shaft in the lateral direction. The upper movable member 10 substantially overlaps with the upper frame 41 of the backrest frame 16. Therefore, the mechanism for transmitting the movement of the lower movable member 30 to the headrest 3 does not substantially interfere with the cushion 5 of the backrest 2A. Hence, the transmission mechanism is operated smoothly, and decline of performance of the cushion 5 is prevented.

| TABLE OF REFERENCE CHARACTERS | |
|---|---|
| 1 | vehicle seat |
| 2A | backrest |
| 2B | seat bottom |
| 3 | headrest |
| 4 | head support |
| 5 | cushion |
| 6 | pillars |
| 10 | upper movable member; headrest support member |
| 11 | pillar supports |
| 12a | outward extension |
| 12b | forward extension |
| 13 | intersection |
| 14 | protrusion |
| 14a | anteroposterior extension; forward bent portion |
| 15 | upper link mechanism |
| 16 | backrest frame |
| 17 | long first link; downward extension |
| 18 | arm; second link member |

-continued

TABLE OF REFERENCE CHARACTERS

| | |
|---|---|
| 19 | shaft; second coupling shaft |
| 20 | L-shaped bracket; bracket; bracket member |
| 21 | shaft; second link support shaft |
| 23 | second link; first link member |
| 24 | shaft; first coupling shaft |
| 25 | shaft; first link support shaft |
| 27 | long coupling rod; transmission member |
| 28 | shaft |
| 29 | upper spring |
| 30 | lower movable member; back-and-forth movable body; sensing member |
| 30a | coupling plate member; coupling member; end extension |
| 30a1 | first extension |
| 30a2 | second extension |
| 30a3 | third extension |
| 30b | first backward protrusion; upper backward protrusion |
| 30c | second backward protrusion; lower backward protrusion |
| 30d1 | first bent portion |
| 30d2 | second bent portion |
| 30e | plate shaped portion |
| 30f | backward protrusion |
| 30g | shaft member |
| 31 | lower link; bell crank; link member |
| 32 | lower link mechanism |
| 35 | lower bracket; bracket member |
| 36 | shaft; link support shaft |
| 37 | shaft |
| 38 | shaft; coupling shaft |
| 39 | spring |
| 40 | side frame |
| 40a | inward extension |
| 41 | upper frame |
| 42 | lower frame |
| 50 | outwardly recessed portion |
| 51 | link support portion |
| 52 | link support surface |
| 53 | bracket attachment |
| 54 | first extension |
| 55 | second extension |
| 56 | bent portion |

What is claimed is:

1. A vehicle seat comprising:
a side frame constituting a seat back frame;
a headrest for supporting a head of a seat occupant; and
a headrest support member laterally extending and movably attached to the side frame to support the headrest; wherein
the headrest support member is attached to the side frame via a link member, the link member being coupled to a bracket member attached to the side frame by way of a link support shaft; and
an inward flange portion extending inward is formed at a front end part of the side frame, the inward flange portion being formed with a recessed portion that is recessed in a direction away from a center of the seat and towards an outer edge of the seat at a position where the bracket member is at least partially overlapped by the recess in a front-to-back direction.

2. The vehicle seat according to claim 1, wherein:
the bracket member is laterally opposed to the link member and provided with a link support portion for supporting the link member; and
the link support portion is positioned at the same height as the recessed portion.

3. The vehicle seat according to claim 1, wherein:
the bracket member is laterally opposed to the link member and provided with a link support portion for supporting the link member; and
the link support portion is arranged laterally opposite to the recessed portion.

4. The vehicle seat according to claim 1, wherein:
a lower end of the recessed portion is provided above a lower end of the link member;
the bracket member is laterally opposed to the link member and provided with a link support portion for supporting the link member; and
the link support portion is at least partially arranged outside an inner end of the inward flange portion that is positioned at a lower end of the recessed portion.

5. The vehicle seat according to claim 4, wherein:
the link member includes a bracket attachment opposed and attached to the bracket member; and
a laterally outer surface of the bracket attachment is arranged on substantially a same vertical plane as an inner end part of the inward flange portion that is positioned at a lower end of the recessed portion.

6. The vehicle seat according to claim 1, wherein:
a lower end of the recessed portion is provided above a lower end of the link member;
the bracket member is laterally opposed to the link member and provided with a link support surface for supporting the link member; and
the link support surface and an inner end part of the inward flange portion that is positioned at a lower end of the recessed portion are arranged on substantially a same vertical plane.

7. The vehicle seat according to claim 1, wherein:
a lower end of the recessed portion is provided above a lower end of the link member; and
an outer end part of the link support shaft is arranged outside the inner end of the inward flange portion that is positioned at a lower end of the recessed portion.

8. The vehicle seat according to claim 1, wherein the bracket member is at least partially arranged within the recessed portion in frontal view.

9. The vehicle seat according to claim 1, wherein the link support shaft is at least partially arranged within the recessed portion in frontal view.

10. The vehicle seat according to claim 1, wherein:
the link member includes a bracket attachment opposed and attached to the bracket member, a first extension extending downward from the bracket attachment, and a second extension provided above the first extension and extending in a direction different from that of the first extension; and
the second extension is arranged to move closer in proximity to the recessed portion when the seat occupant moves further backward.

11. The vehicle seat according to claim 1, wherein:
the link member includes a bracket attachment opposed and attached to the bracket member, a first extension extending downward from the bracket attachment, and a second extension extending in a direction different from that of the first extension; and
the first and second extensions are arranged laterally inward from the bracket attachment via a bent portion.

12. The vehicle seat according to claim 11, wherein the bent portion is provided at a same height as the recessed portion.

13. The vehicle seat according to claim 11, wherein:
a laterally inner surface of the bracket attachment is arranged outside laterally inner surfaces of the first and second extensions; and
the link support shaft is partially arranged on the laterally inner surface of the bracket attachment.

14. The vehicle seat according to claim 1, wherein:
the link member includes a bracket attachment opposed and attached to the bracket member; and
the bracket attachment is provided at a same height as the recessed portion.

15. The vehicle seat according to claim 1, wherein:
the link member includes a bracket attachment opposed and attached to the bracket member; and
the bracket attachment protrudes toward the recessed portion.

16. The vehicle seat according to claim 1, wherein a lower end part of the recessed portion is arranged on a same horizontal plane as the link member.

17. A vehicle seat comprising:
a side frame constituting a seat back frame;
a headrest for supporting a head of a seat occupant;
a headrest support member laterally extending and movably attached to the side frame to support the headrest; and
a link member for attaching the headrest support member to the side frame,
wherein:
the headrest support member is provided with a downward extension extending downward, the downward extension being coupled to the link member by way of a coupling shaft and the link member being coupled to a bracket member attached to the side frame by way of a link support shaft;
an inward flange portion extending inward is formed at a front end part of the side frame, the inward flange portion being formed with a recessed portion that is recessed in a direction away from a center of the seat and towards an outer edge of the seat at a position where the bracket member is at least partially overlapped by the recess in a front-to-back direction; and
a lower end part of the recessed portion is arranged on a same horizontal plane as the link member.

18. The vehicle seat according to claim 17, wherein the lower end part of the recessed portion is provided above a lower end part of the downward extension.

19. The vehicle seat according to claim 17, wherein:
the downward extension is coupled to first and second link members by way respectively of first and second coupling shafts;
the first and second link members are coupled to the bracket member by way respectively of first and second link support shafts; and
the first link member is coupled via a transmission member to a movable member that is arranged to be moved backward with a backward movement of the occupant, the movable member being supported on the side frame.

20. The vehicle seat according to claim 17, wherein:
the bracket member is laterally opposed to the link member and provided with a link support portion for supporting the link member; and
the link support portion is arranged at a same height as and laterally opposite to the recessed portion.

21. The vehicle seat according to claim 17, wherein:
the bracket member is laterally opposed to the link member and provided with a link support portion for supporting the link member; and
the lower end of the recessed portion is provided above a lower end of the link member; and
the link support portion is positioned at a same height as the recessed portion and at least partially arranged outside an inner end of the inward flange portion that is positioned at the lower end of the recessed portion.

22. The vehicle seat according to claim 17, wherein:
the bracket member is laterally opposed to the link member and provided with a link support portion for supporting the link member;
the lower end of the recessed portion is provided above a lower end of the link member; and
the link support portion is positioned at a same height as the recessed portion and arranged on substantially a same vertical plane as an inner end part of the inward flange portion that is positioned at the lower end of the recessed portion.

23. The vehicle seat according to claim 17, wherein:
the bracket member is laterally opposed to the link member and provided with a link support portion for supporting the link member;
the link support portion is arranged at a same height as and laterally opposite to the recessed portion;
the lower end of the recessed portion is provided above a lower end of the link member; and
the link support portion is at least partially arranged outside the inner end of the inward flange portion that is positioned at the lower end of the recessed portion.

24. The vehicle seat according to claim 17, wherein:
the bracket member is laterally opposed to the link member and provided with a link support portion for supporting the link member;
the link support portion is positioned at a same height as the recessed portion;
a lower end of the recessed portion is provided above a lower end of the link member; and
an outer end part of the link support shaft is arranged outside an inner end of the inward flange portion that is positioned at the lower end of the recessed portion.

25. The vehicle seat according to claim 17, wherein the bracket member and the link support shaft are both at least partially arranged within the recessed portion in frontal view.

26. The vehicle seat according to claim 17, wherein:
the link support shaft is at least partially arranged within the recessed portion in frontal view;
the link member includes a bracket attachment opposed and attached to the bracket member, a first extension extending downward from the bracket attachment, and a second extension provided above the first extension and extending in a direction different from that of the first extension; and
the second extension is arranged to move closer in proximity to the recessed portion when the seat occupant moves further backward.

27. The vehicle seat according to claim 17, wherein:
the link member includes a bracket attachment opposed and attached to the bracket member, a first extension extending downward from the bracket attachment, and a second extension provided above the first extension and extending in a direction different from that of the first extension;
the second extension is arranged to move closer in proximity to the recessed portion when the seat occupant moves further backward; and
a lower end part of the recessed portion is arranged on the same horizontal plane as the link member.

28. The vehicle seat according to claim 17, wherein:
the bracket member and the link support shaft are both at least partially arranged within the recessed portion in frontal view;
the link member includes a bracket attachment opposed and attached to the bracket member, a first extension extending downward from the bracket attachment, and a second extension extending in a direction different from that of the first extension; and the first and second extensions are arranged laterally inward from the bracket attachment via a bent portion.

29. The vehicle seat according to claim 17, wherein:

the link member includes a bracket attachment opposed and attached to the bracket member, a first extension extending downward from the bracket attachment, and a second extension extending in a direction different from that of the first extension;

the first and second extensions are arranged laterally inward from the bracket attachment via a bent portion, the bent portion being provided at a same height as the recessed portion;

a laterally inner surface of the bracket attachment is arranged outside laterally inner surfaces of the first and second extensions; and the link support shaft is partially arranged on the laterally inner surface of the bracket attachment.

30. The vehicle seat according to claim 17, wherein:

the link support shaft is at least partially arranged within the recessed portion in frontal view;

the link member includes a bracket attachment opposed and attached to the bracket member; and the bracket attachment is provided at a same height as the recessed portion.

31. The vehicle seat according to claim 17, wherein:

the link member includes a bracket attachment opposed and attached to the bracket member;

the bracket attachment is provided at a same height as the recessed portion; and a laterally outer surface of the bracket attachment is arranged on substantially a same vertical plane as an inner end part of the inward flange portion that is positioned at the lower end of the recessed portion.

32. The vehicle seat according to claim 17, wherein:

the link member includes a bracket attachment opposed and attached to the bracket member; and the bracket attachment is provided at a same height as the recessed portion and protrudes toward the recessed portion.

33. The vehicle seat according to claim 17, wherein the recessed portion is provided above a lower end part of the downward extension.

34. A vehicle seat comprising:

left and right side frames constituting a seat back frame;

a headrest having a head support for supporting a head of a seat occupant and pillars provided on the head support;

a headrest support member movably attached to the seat back frame to support the headrest;

link members for attaching the headrest support member to the seat back frame; and tubular pillar supports for inserting lower parts of the respective pillars therein, the tubular pillar supports being fixed to the headrest support member;

wherein:

the headrest support member is provided with outward extensions extending outward from positions where the respective pillar supports are fixed and downward extensions extending downward from the respective outward extension, the downward extensions being coupled to the respective link members by way of a coupling shaft and the link members being coupled to a bracket member attached to the respective side frames by way of a link support shaft;

a sensing member for sensing a backward movement of the seat occupant is provided between the left and right downward extensions;

inward flange portions extending inward are formed at front end parts of the respective side frames, the inward flange portions being each formed with a recessed portion that is recessed in a direction away from a center of the seat and towards an outer edge of the seat at a position where the respective bracket members are at least partially overlapped by the recess in a front-to-back direction; and a lower end part of the recessed portion is arranged on the same horizontal plane as the link members.

35. The vehicle seat according to claim 34, wherein a portion of the recessed portion opposed to the corresponding bracket member has a curved shape.

36. The vehicle seat according to claim 34, wherein:

the bracket member is laterally opposed to the link member and provided with a link support portion for supporting the link member;

the link support portion is arranged at a same height as and laterally opposite to the recessed portion;

the lower end of the recessed portion is provided above a lower end of the link member; and the link support portion is at least partially arranged outside an inner end of the inward flange portion that is positioned at the lower end of the recessed portion.

37. The vehicle seat according to claim 34, wherein:

the bracket member is laterally opposed to the link member and provided with a link support portion for supporting the link member;

the link support portion is arranged at a same height as and laterally opposite to the recessed portion;

a lower end of the recessed portion is provided above a lower end of the link member; and an outer end part of the link support shaft is arranged outside an inner end of the inward flange portion that is positioned at the lower end of the recessed portion.

38. The vehicle seat according to claim 34, wherein:

the bracket member is laterally opposed to the link member and provided with a link support portion for supporting the link member;

the lower end of the recessed portion is provided above a lower end of the link member; and the link support portion is positioned at a same height as the recessed portion and arranged on substantially a same vertical plane as an inner end part of the inward flange portion that is positioned at the lower end of the recessed portion.

39. The vehicle seat according to claim 34, wherein:

a lower end of the recessed portion is provided above a lower end of the link member;

an outer end part of the link support shaft is arranged outside an inner end of the inward flange portion that is positioned at the lower end of the recessed portion; and the bracket member and the link support shaft are both at least partially arranged within the recessed portion in frontal view.

40. The vehicle seat according to claim 34, wherein:

each of the link members includes a bracket attachment opposed and attached to the corresponding bracket member, a first extension extending downward from the bracket attachment, and a second extension provided above the first extension and extending in a direction different from that of the first extension;

the second extension is arranged to move closer in proximity to the recessed portion when the seat occupant moves further backward;

the first and second extensions are arranged laterally inward from the bracket attachment via a bent portion, the bent portion being provided at a same height as the corresponding recessed portion.

41. The vehicle seat according to claim 34, wherein:

a lower end of the recessed portion is provided above a lower end of the link member;

an outer end part of the link support shaft is arranged outside an inner end of the inward flange portion that is positioned at the lower end of the recessed portion;

a laterally inner surface of the bracket attachment is arranged outside laterally inner surfaces of the first and second extensions;

the link support shaft is partially arranged on the laterally inner surface of the bracket attachment;

the link member includes a bracket attachment opposed and attached to the bracket member; and the bracket attachment is provided at a same height as the recessed portion.

42. The vehicle seat according to claim 34, wherein:

the bracket member is laterally opposed to the link member and provided with a link support portion for supporting the link member;

the link support portion is positioned at a same height as the recessed portion;

the link member includes a bracket attachment opposed and attached to the bracket member; and the bracket attachment is provided at a same height as the recessed portion and protrudes toward the recessed portion.

43. The vehicle seat according to claim 1, wherein:

the headrest support member is arranged on a same horizontal plane as the link member and the bracket member; and the link member and the bracket member are at least partially arranged in an overlapped manner in a front-to-back direction.

44. The vehicle seat according to claim 1, wherein a portion of the recessed portion opposed to the bracket member has a curved shape.

* * * * *